United States Patent [19] [11] 4,077,132
Erickson [45] Mar. 7, 1978

[54] DIGITAL LEVEL INDICATOR

[75] Inventor: Kent E. Erickson, Brookside, N.J.

[73] Assignee: Keuffel & Esser Company, Morristown, N.J.

[21] Appl. No.: 770,951

[22] Filed: Feb. 22, 1977

[51] Int. Cl.² ............................................. G01C 9/06
[52] U.S. Cl. ................................. 33/366; 73/517 R; 340/200
[58] Field of Search .......... 33/366; 73/516 R, 517 R, 73/517 B, 382 R; 331/49; 323/93; 340/200

[56] References Cited

U.S. PATENT DOCUMENTS

| | | | |
|---|---|---|---|
| 2,322,681 | 6/1943 | Zenor | 73/382 |
| 2,848,710 | 8/1958 | Owen | 340/200 |
| 3,438,266 | 4/1969 | Carow et al. | 73/516 R |

Primary Examiner—James J. Gill
Attorney, Agent, or Firm—Lionel N. White

[57] ABSTRACT

A level indicator providing a digital display of gravity-related attitude comprises a capacitive gravimeter pickup assembly the complementary capacitor pair of which are alternately switched, on an equal-time basis, into an R.C. oscillator circuit. Concurrently, each oscillator pulse train is switched, respectively, into the up- and down-mode of reversible counting means to yield a net oscillator frequency difference directly, digitally indicative of the degree of departure from a gravity-referenced level condition.

8 Claims, 3 Drawing Figures

DIGITAL LEVEL INDICATOR

BACKGROUND

Previously known gravimeters, or accelerometers, utilizing capacitive pickups have been of the type which generally employ driving means responsive to a change in capacitive coupling to provide a null-restoring force to a pendulously-supported mass which includes one plate of a variable capacitor. The amount of feed-back current, as determined by the capacitor plate spacings due to movement of the mass, needed to restore the mass to a null position provides an indication of the momentary degree of variation from a level attitude in the device.

In most instances the recovery of a gravity-referenced null is the prime concern in such devices, the indication of degree of mislevel being for the most part axillary to that function of the device. Thus, such "restoring drive" devices have, at best, been capable of indicating a maximum momentary deviation from gravity null, yet have not provided a persistent signal of varying mislevel in any associated instrument. Further, it has been a consistent disadvantage of such mislevel-correcting devices that a significant amount of power is required, particularly in the restoring drive circuitry, in order to enable these instruments to complete their intended functions.

Other types of devices, more closely akin in function to the "spirit level", include a pendulously-supported core member which effects an inductive coupling in appropriate circuitry to generate an analog signal proportional to the degree of deviation of the instrument from a gravity-referenced level attitude. Again the power consumed in the operation of such an inductive pickup device, as well as the extensive circuitry required and unavoidable translation errors occasioned in analog-to-digital conversion, have further rendered these devices particularly unsuited to use in compact level-indicating instruments.

The present invention avoids the earlier disadvantages generally found in previously available instruments and provides a rugged, compact device which requires little power for operation and which provides, to a high degree of accuracy, a direct digital reading of conditions of gravity-related attitudes over a range of plus or minus 200 seconds of arc.

SUMMARY

The present invention utilizes a capacitive pickup in a level-indicating device comprising a pair of capacitors which share a common, pendulously-supported plate and, as a result, individually exhibit greater and lesser degrees of capacitive coupling as the gravity-urged movements of the suspended plate between the two fixed, cooperating plates of the respective capacitor devices change the spacings between these elements.

By appropriate clocked switching means, first one and then the other of these variable capacitors are alternately placed in an oscillator circuit which generates a pulse train at a frequency determined by the then spacing between the common plate and that fixed plate in operative connection with the circuit. In this manner there is effectively produced a pair of oscillators which share substantially all major components, thereby ensuring a high degree of comparative stability in frequencies.

A reversible counter in the device receives the pulse trains generated by the oscillator circuit and accumulates a pulse count in whichever of its up or down counting modes is enabled. As the switching means effects the alternating between capacitors in the oscillator circuit, it simultaneously switches the counter between up-count and down-count conditions, thus enabling an increasing count at the first oscillator frequency followed by a decreasing count at the other oscillator frequency.

At the conclusion of each such counting cycle, the remaining net count, indicative of the difference in plate spacings, thus the pendulum displacement in the capacitive pickup, is latched and strobed over to a display, or other utilization means, where any deviation of the device from a level attitude may be digitally shown.

DRAWINGS

DESCRIPTION

Figure 1:
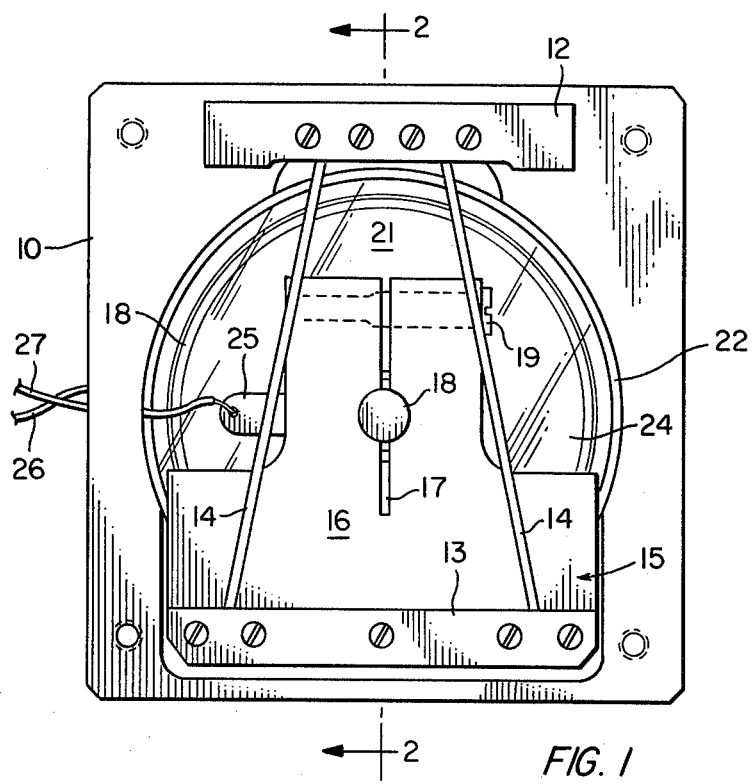
FIG. 1 shows an embodiment of the capacitive pickup of the present invention.

An embodiment of the level sensor, or capacitive pickup device, employed in the present invention is shown in FIG. 1 and comprises a body 10 having a central cavity in which a pendulum assembly 15 is suspended by strap members 14 for gravity-responsive movement with any change in the tilt attitude of body 10. Pendulum assembly 15 may be more clearly seen in FIG. 2 as comprising a pair of pendulum support members 16 in each of which is affixed one end of the shaft extensions of pendulum member 18 which serves as the common capacitor plate of the pickup. Supports 16 are slotted at 17 allowing tiebolts 19 to effect a firm engagement of the shaft ends of pendulum member 18.

Figure 2:
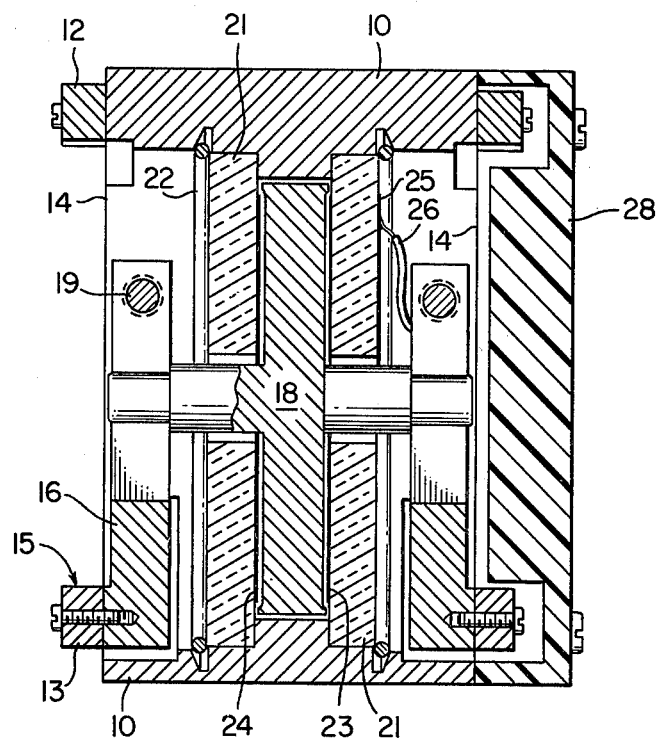
FIG. 2 is another view, in section, of the pickup device taken along 2—2 in FIG. 1.

The upper extensions of suspension straps 14 are affixed to body 10 by clamp bar 12, while the lower extensions of those straps are laterally displaced and affixed to pendulum support members 16 by lower clamp bars 13. Thus constructed, pendulum assembly 15, and, in particular, common capacitor plate member 18, are free to move within the cavity of body 10, as seen in FIG. 2 with any tilt or displacement of body 10 from a gravity-horizontal attitude.

Mounted within the cavity of body 10 by means of spring rings 22 are plates 21 of insulating material, such as glass or the like, which carry, in the form of coated metal films, fixed capacitor plates 23, 24. In the described embodiment, such metal films having an area of about 650 mm$^2$ are separated from common plate 18 by about 125 $\mu$m when the device is in a level condition, yielding a capacitive value in each pickup capacitor amounting to about 50 pF. Extensions of the metal film coatings on plates 21 to the accessible exterior of the inter-plate space, as at tongues 25, provide contacts for circuit leads 26, 27. The ground contact for the circuitry associated with the sensor is effected through metal suspension straps 14, of Be-Cu for example, to conductive body 10. The metal film coatings are preferably limited in size to extend to not less than about 3 mm from body 10 in order to minimize stray capacitance which could adversely effect the linearity of the intended response in the pickup. End covers 28, of which one only is shown in FIG. 2, complete the level sensor, forming a rugged, dustproof assembly.

The capacitive pickup device described above will be seen to provide a means whereby a common capacitor plate 18 may move, under the influence of gravity, between two cooperating capacitor plates 23, 24 to provide varying capacitive couplings which may be employed as an indication of the displacement of the pickup assembly from a horizontal attitude. The physical stability of this sensor is enhanced by such structural features as, for example, the angled disposition of suspension straps 14 which, in particular, discourages radial movement of suspended plate member 18. Further, the close spacing, for example about 95 $\mu$m, between the periphery of plate 18 and the walls of its cavity as formed by body 10 and plates 21 simply and effectively provides both air dampening and mechanical caging to eliminate vibratory oscillation of the pendulum and guard against damage from sudden jars or jolts.

Figure 3:
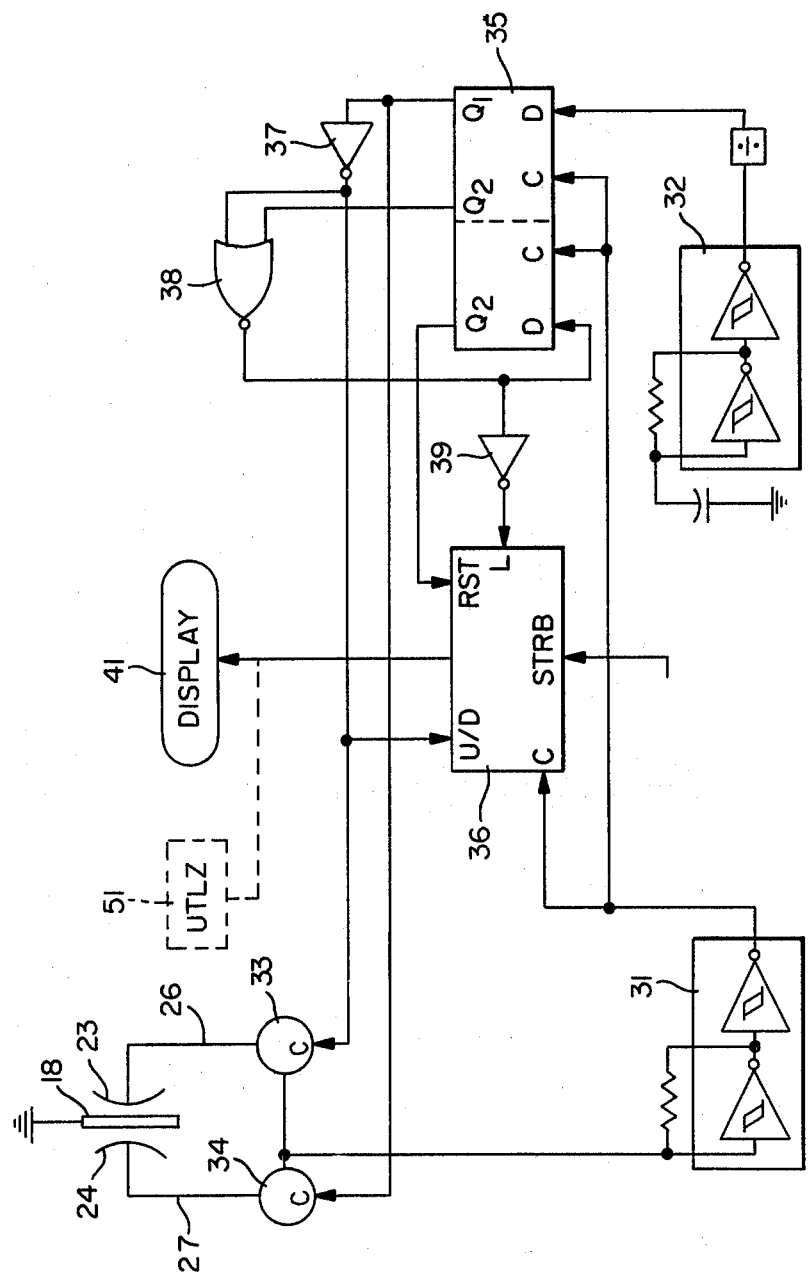
FIG. 3 is a schematic of the electronics utilized in an embodiment of the level-indicating device of the present invention.

In FIG. 3 the capacitive pickup assembly is simply shown schematically as common plate 18 and cooperating capacitor plates 23, 24 which are placed in circuit with the remainder of the electronics by means of conductors 26, 27.

A square wave oscillator 31 is constructed, for example, from Schmitt Trigger elements, such as the MM74C14 device supplied by National Semiconductor Corporation, Santa Clara, Calif., connected in circuit with plates 23, 24 of the capacitive pickup through low capacitance bilateral switches 33, 34, such as the CD4016 device supplied by RCA Corporation. By means of additional circuitry described below one each of switches 33, 34 is closed alternately with the other during counting cycles, thus causing oscillator 31 to generate pulse trains varying in frequency, for example between about 15 to 25 KHz, according to the capacitive coupling between pendulously-suspended common plate 18 and the respective ones of capacitor plates 23, 24. The pulse train output from oscillator 31 is conducted to the clock input terminal, C, of up-down counter 36 which may, for example, be a device supplied by Hughes Aircraft Company, Newport Beach, Calif., under the designation HCTR4010.

A second square-wave oscillator 32 arranged to provide a pulse train of constant frequency of about 4 KHz serves as a master clock in the level indicator device. Conducted through a conventional divider to switching control device 35, which may be, for example, a four-stage shift register such as the CD4015 device supplied by RCA Corporation, the lower frequency pulse train, at about 1 Hz, proceeds to switches 33, 34 along parallel conductors, including inverter 37, and effects the simultaneous respective opening and closing of switches 33, 34. Thus, on the fixed time basis established by control device 35, capacitors 23, 24 are alternately placed in the circuit of oscillator 31 to provide, whenever the sensor is out of level, the pair of varied frequency pulse trains as earlier described. It will be appreciated, of course, that a level condition of the sensor will result in a pair of alternating pulse trains of equal frequency.

Synchronized with the switching between capacitor plates 23, 24, one train of switching pulses is directed to the up-down control terminal, U/D, of counter 36. As a result, each of the two pulse trains from oscillator 31 are applied to the counter to alternately effect an up-counting at the first frequency and a reversed down-counting at the other pulse frequency. During each counting cycle, therefore, there is effected a net count which is directly related to the degree of deviation of the pickup device from a true gravity horizontal attitude.

Further synchronized with the up-down count switching sequence through the operation of shift register device 35 and logic elements comprising NOR gate 38 and inverters 37, 39 is a series of pulses directed to input terminal, L, of counter 36 to control the latching function which updates and holds the net up-down count through the following counting cycle. A strobing pulse, either generated within the circuit or originating as a command from external electronics, not shown, acts to relay the up-down count indicative of the extent of mislevel in the device as digital data to conventional drivers and visual display elements, all generally represented at 41. Appropriate factoring, depending upon the actual count frequency range, is applied in the display circuitry to achieve a final readout of the actual deviation from true horizontal directly in conventional units, such as seconds of arc.

Subsequent to transfer of the digital data from counter 36 to display 41, a further output synchronized by control device 35 is directed to reset function input terminal, RST, of counter 36 to clear the counter prior to commencement of each following up-down counting cycle.

In addition to the actual display of the degree of mislevel at 41, the level indicator of the present invention may be employed to provide digital data to an associated greater instrument represented at 51. In this manner the present device may be employed to inject such deviation data as will enable the greater utilizing instrument to effect appropriate correction in overall attitude or in display of function. For example, incorporation of the present level indicator as a generator of digital data indicative of deviations from true horizontal attitude in a surveying instrument provides a means whereby the digital data output of the instant device may be incorporated directly into measured elevation data to provide a true reading of elevations measured in the surveying system.

What is claimed is:
1. A level indicator comprising:
  a. a capacitive level sensor comprising a pair of capacitors including a common, pendulously-suspended plate member;
  b. means forming an oscillator circuit with a capacitor of said sensor;
  c. means for regularly, alternately placing one and the other of said sensor capacitors in said oscillator circuit;
  d. means in circuit with the output of said oscillator circuit for accumulating counts of the output of said oscillator circuit effected during the respective periods of incorporation of each said sensor capacitor in said circuit and for determining the difference between the respective counts so accumulated; and
  e. means utilizing said count difference to provide a response indicative of the extent of departure of said sensor from a level attitude.

2. A level indicator comprising:
  a. a capacitive level sensor comprising a pair of capacitors including a common, pendulously-suspended plate member;
  b. means forming a first oscillator circuit with a capacitor of said sensor;

c. actuable switching means for alternately incorporating one and the other of said sensor capacitors in said first oscillator circuit;

d. means forming a second oscillator circuit having a substantially fixed frequency output;

e. first counting means in circuit with the output of one of said oscillator circuits;

f. means responsive to a predetermined number of counts in said first counting means to actuate said switching means;

g. means in circuit with the output of the other of said oscillator circuits for accumulating counts of the output of said other of said oscillator circuits effected during the respective periods of incorporation of each said sensor capacitor in said first oscillator circuit and for determining the difference between the respective counts so accumulated; and h. means utilizing said count difference to provide a response indicative of the extent of departure of the sensor from a level attitude.

3. A level indicator comprising:

a. a capacitive level sensor comprising a pair of capacitors including a common, pendulously-suspended plate member;

b. means forming an oscillator circuit with a capacitor of said sensor;

c. means for regularly, alternately placing one and the other of said sensor capacitors in said oscillator circuit;

d. a reversible counter in circuit with the output of said oscillator circuit;

e. means for switching said counter between its up and down counting modes simultaneously with said alternating of capacitors; and f. means utilizing the net count resulting from an up and down counting cycle to provide a response indicative of the extent of departure of said sensor from a level attitude.

4. A level indicator according to claim 3 wherein said level sensor comprises:

a. a body member having a central bore;

b. a pair of support members spaced longitudinally of said bore;

c. an electrically conductive plate member mounted between said support members within and extending transversely of said bore;

d. means extending between said body and respective ones of said support members and suspending said support members and said supported plate member for movement longitudinally of said bore;

e. a pair of stationary electrically conductive plate members fixed transversely of said bore and, with the wall of said bore, forming a cavity closely encompassing said supported plate member, thereby establishing a pair of capacitors with said supported plate member and effecting an air dampening of said longitudinal movement thereof; and f. electrical conducting means communicating between the exterior of said cavity and the respective ones of said stationary and supported plate members.

5. A level indicator according to claim 4 wherein said level sensor further comprises a pair of cover plate members affixed to said body member to overlie the respective ends of the bore thereof, thereby forming a substantially air-tight enclosure for said support and plate members.

6. A level indicator according to claim 3 wherein said utilizing means comprises visual digital display elements and driver circuitry therefor.

7. A level indicator according to claim 3 wherein said utilizing means included angle computing and display means comprising part of a surveying system.

8. A level indicator comprising:

a. means forming an oscillator circuit the output signal frequency of which is responsive to the value of a capacitor in said circuit;

b. capacitive level sensing means comprising a conductive plate pendulously suspended between a pair of relatively fixed parallel conductive plates, thereby forming a pair of capacitors the values of which vary in opposite senses as a result of the gravity responsive movement of said suspended plate between said fixed plates;

c. switching means for alternately connecting one and the other of said capacitor pair in said oscillator circuit for substantially equal periods of time, thereby to influence said output signal frequency in accordance with one or the other value of said capacitors;

d. reversible counting means in circuit with said oscillator means output;

e. means synchronized with said switching means for reversing the counting sense of said counting means contemporaneously with said switching between said pair of capacitors, thereby to effect an increasing count at the oscillator output frequency influenced by said one capacitor and a decreasing count at the oscillator output frequency influenced by said other capacitor and to obtain a net count indicative of the degree of variance of said level sensing means from a level attitude; and f. means utilizing said net count to provide a response indicative of said degree of variance from level.

* * * * *